US012606304B2

(12) United States Patent　　　　(10) Patent No.: US 12,606,304 B2
Parkinson et al.　　　　　　　　　　(45) Date of Patent: Apr. 21, 2026

(54) UNIVERSAL MARITIME CRAFT AERIAL DELIVERY SYSTEM

(71) Applicant: Capewell Aerial Systems LLC, South Windsor, CT (US)

(72) Inventors: Stephen Parkinson, Penarth (GB); Adam J. Fitzgerald, Enfield, CT (US)

(73) Assignee: Capewell Aerial Systems LLC, South Windsor, CT (US)

( * ) Notice: Subject to any disclaimer, the term of this patent is extended or adjusted under 35 U.S.C. 154(b) by 602 days.

(21) Appl. No.: 18/165,585

(22) Filed: Feb. 7, 2023

(65) Prior Publication Data

US 2024/0262500 A1　　Aug. 8, 2024

(51) Int. Cl.
　　*B64D 1/12*　　　　(2006.01)
　　*B63B 17/00*　　　　(2006.01)
　　*B63C 9/01*　　　　(2006.01)
　　*B64D 1/08*　　　　(2006.01)
(52) U.S. Cl.
　　CPC ............... *B64D 1/12* (2013.01); *B63B 17/00* (2013.01); *B63C 9/01* (2013.01); *B64D 1/08* (2013.01); *B63B 2017/0054* (2013.01)
(58) Field of Classification Search
　　CPC ... B64D 1/00; B64D 1/08; B64D 1/12; B64D 1/14; B63B 17/00; B63C 9/00; B63C 9/01
　　USPC .................. 441/83; 244/137.3, 137.4, 138 R
　　See application file for complete search history.

(56) References Cited

U.S. PATENT DOCUMENTS

| | | | | |
|---|---|---|---|---|
| 8,066,224 B2 * | 11/2011 | Schafer | .................... | B64D 1/14 |
| | | | | 244/137.4 |
| 8,414,235 B2 | 4/2013 | Parkinson | | |
| 8,567,724 B2 * | 10/2013 | Parkinson | ................ | B64D 1/02 |
| | | | | 244/137.3 |
| 2008/0258011 A1 | 10/2008 | Schafer | | |

(Continued)

FOREIGN PATENT DOCUMENTS

GB　　　2151575　　　7/1985

OTHER PUBLICATIONS

PCT International Search Report and Written Opinion for International Application No. PCT/US2023/062125 filed on Feb. 7, 2023, Date of Mailing: Aug. 9, 2023; 15 pgs.

(Continued)

*Primary Examiner* — Lars A Olson
(74) *Attorney, Agent, or Firm* — Alix, Yale & Ristas, LLP

(57)　　　　　　ABSTRACT

A universal maritime craft aerial delivery system (UMCADS) is an airdrop system that enables the delivery, by parachute from military transport aircraft, of a multitude of surface and subsurface marine craft. The UMCADS can be used to deploy marine craft that will be manned on splash down and unmanned autonomous marine craft that could be operational immediately on landing. The UMCADS allows air cargo crews to assemble an air cargo transport platform from standard, modular components, reposition sub-assemblies and swap them out to accommodate a wide range of marine craft without the need to redesign the platform or recourse to the manufacturer. Incorporating actuators that do not require manual positioning by personnel beneath the platform during loading improves safety. A proven single point release system triggered by the actuator releases the platform from the marine craft after the marine craft and platform have left the delivery aircraft.

20 Claims, 9 Drawing Sheets

(56) References Cited

U.S. PATENT DOCUMENTS

2011/0240800 A1   10/2011  Fox, Jr.
2011/0318097 A1   12/2011  Parkinson
2022/0324368 A1   10/2022  Parkinson et al.

OTHER PUBLICATIONS

XP55221470, "ENCM-TM-75-3 Evaluation Tests of the Type V Airdrop Platform and Associated Hardware", Patrick J. O'Brien, Jul. 30, 1975, Aeronautical Systems Division, Air Force Systems Command, 218 pgs.

* cited by examiner

26

26

UNIVERSAL MARITIME CRAFT AERIAL DELIVERY SYSTEM

BACKGROUND

The disclosure relates to a modular, configurable marine airdrop platform for aerial delivery of manned and unmanned marine craft.

For aerial delivery systems to which the disclosure relates, a cargo is secured to a platform which is loaded into an aircraft. The platform has a standard width and includes a bottom surface configured to be supported on arrays of rollers in the floor of the aircraft. The platform is extracted from the aircraft by an extraction parachute. For aerial delivery over land, suspension parachutes are then deployed to control descent of the cargo and platform which remain together until they reach the ground. The cargo is then released from the platform. Systems for aerial delivery of manned and unmanned surface and subsurface marine craft are distinct from systems used for aerial delivery of vehicles and cargo over land. Land based vehicles and equipment typically have wheels, treads or bases that will support the vehicle or equipment upright when placed upon a flat support such as an aerial delivery platform, and the land-based vehicles and cargo remain secured to the platform during descent. Large marine craft have hulls with shapes that must be supported for the craft to remain secure and upright on a platform during aerial transport. Further, the platform must be separated from the marine craft during descent to allow the marine craft to land with its hull in the water. When marine craft are deployed in a military scenario, it may be desirable for the platform to sink to reduce visible evidence that a marine craft has been delivered.

Current methods of aerial delivery of marine craft employ a mechanically actuated release mechanism to ensure separation of the marine craft from the platform during descent. The mechanism releases all the latches that connect the craft to the platform. The release mechanism actuator is positioned in the middle of the forward end of the platform as it is installed in the aircraft, and is triggered after the platform has been extracted from the aircraft. Setting the actuator requires a person to be present beneath the platform as it is loaded onto the aircraft, which is a hazardous process.

Existing platforms for aerial delivery of marine craft are typically customized for each marine craft and cannot be reconfigured for use with different marine craft. Use of unique aerial delivery platforms for each marine craft is logistically complicated and costly.

There is a need for an aerial delivery system for marine craft that is constructed from standard components that can be assembled to support a wide variety of marine craft, eliminating the need to purchase and store a large number of unique aerial delivery systems.

There is a need for an improved aerial delivery system for marine craft where the mechanism releasing the platform from the marine craft does not require personnel in a hazardous position beneath the platform as it is loaded on the aircraft.

SUMMARY OF THE INVENTION

A universal maritime craft aerial delivery system (UMCADS) is an airdrop system that enables the delivery, by parachute from military transport aircraft, of a multitude of surface and subsurface marine craft. It is ideally suited to the parachute deployment of marine craft that will be manned on splash down and unmanned autonomous marine craft that could be operational immediately on landing. The novel features of the system allow air cargo crews to reposition sub-assemblies and swap them out to accommodate a wide range of marine craft without the need to redesign the platform or recourse to the manufacturer.

An aerial delivery system is disclosed for marine craft comprising a hull, the aerial delivery system including a platform assembled from standard components to a selected length between fore and aft ends and a standard width between port and starboard side rails. A plurality of cradles are securable at selectable, regularly spaced intervals along the length of the platform, each cradle comprising port and starboard cradle portions, each port and starboard cradle portion including a hull support having hull contact members configured to at least partially deform upon contact with the hull of the marine craft. A plurality of releasable latches are secured to the hull of the marine craft. The releasable latches are functionally connected to a single point release mechanism. At least one elongated tie down member extends from the platform through the plurality of releasable latches and is tensionable to secure the marine craft to the platform during loading and transport of the aerial delivery system in an aircraft. An actuator is secured to the platform, said actuator including an operating arm having a first position where the operating arm is supported while the platform is in the aircraft and a second position that can be reached by the operating arm only after the platform is no longer within the aircraft. The actuator operating arm is connected to the single point release mechanism to release said releasable latches and disconnect the marine craft from the platform after the platform has left the aircraft and while the platform and marine craft are airborne.

In a disclosed embodiment, the aerial delivery system includes a plurality of main parachutes secured directly or indirectly to the hull of the marine craft. An extraction force transfer coupling (EFTC) extends from an aft end of the platform and includes a releasable force transfer latch coupling an extraction parachute to the platform. The extraction parachute is connected to the platform by the EFTC and also to the plurality of main parachutes by a deployment line. The EFTC preventing force transfer between the extraction parachute and the main parachutes until said force transfer latch is released. An extraction force transfer actuator (EFTA) is secured to the platform and has an operating arm supported while the platform is in the aircraft. The operating arm of the EFTA moves to a release position after the platform leaves the aircraft, which releases the force transfer latch, allowing the extraction parachute to deploy the main parachutes.

The disclosed UMCADS may include an additional safety device in the deployment line of the extraction parachute. The safety device is a link that remains open until the UMCADS platform begins moving in the aft direction in the aircraft. Only after the UMCADS platform begins moving in the aft direction does the link close and allow the extraction parachute to deploy the main parachutes.

DETAILED DESCRIPTION

Figure 1:
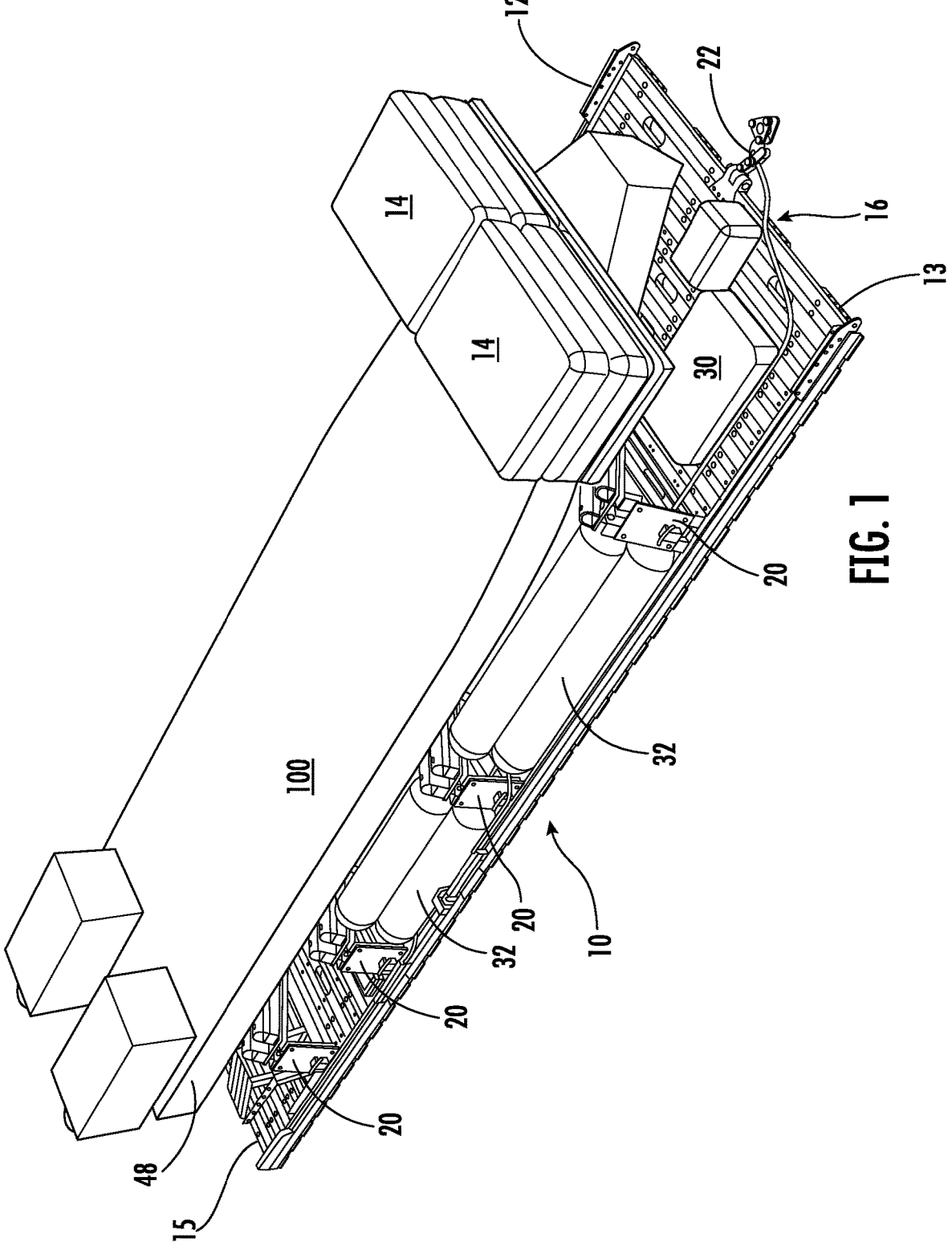
FIG. 1 is a perspective view of an embodiment of a marine craft aerial delivery system loaded with a representative marine craft and parachutes in a condition for loading on a transport aircraft.

Embodiments of a universal marine craft aerial delivery system (UMCADS) will now be described with reference to FIGS. 1-11. The disclosed UMCADS 10 is constructed from four basic sets of components that can be selected and arranged to deliver a variety of manned and unmanned surface and subsurface marine craft 100. The disclosed UMCADS 10 is modular, with standard components that can be assembled in different configurations according to the size, shape, and type of marine craft 100 being delivered. The major assemblies of the UMCADS 10 are the platform 12, the main parachutes 14, the extraction system 16, and the craft-to-platform attachment system 18 (shown in FIG. 9).

The disclosed UMCADS 10 is configured to be compatible with cargo handling systems in aircraft configured for aerial delivery of cargo. Aerial delivery aircraft are equipped with rows of rollers in the floor that support platforms loaded with cargo, where the rollers allow the loaded platforms to be extracted from a rear (aft) door of the aircraft. Aerial delivery aircraft are fitted with two rails that guide platforms loaded with cargo, vertically and laterally. Further, these rails include latches which can lock the platform in the aircraft. The cargo is connected to the platform and the platforms are connected to the aircraft to ensure stability of the cargo during takeoff and maneuvering of the aircraft. FIG. 1 illustrates an embodiment of the disclosed UMCADS 10 loaded with a marine craft 100. The platform 12 has been constructed to have a length compatible with the marine craft 100 and support cradles 20 are arranged along the length of the craft 100 to support the hull in an upright position during transport. The end of the platform 12 facing to the right in FIG. 1 is the aft end 13 of the platform 12 and is equipped with an extraction force transfer coupling (EFTC) 22. The UMCADS 10 is loaded into the aircraft with the aft end 13 of the platform 12 and the EFTC 22 facing the aft end of the aircraft and the rear door of the cargo bay. The directions forward, aft, port and starboard will be used to describe the UMCADS 10 with respect to the aircraft in which it will operate. In the description, the aft end 13 of the platform 12 will be oriented to face the aft end of the aircraft, while the forward end 15 of the platform 12 will face the forward end of the aircraft.

Figure 3:
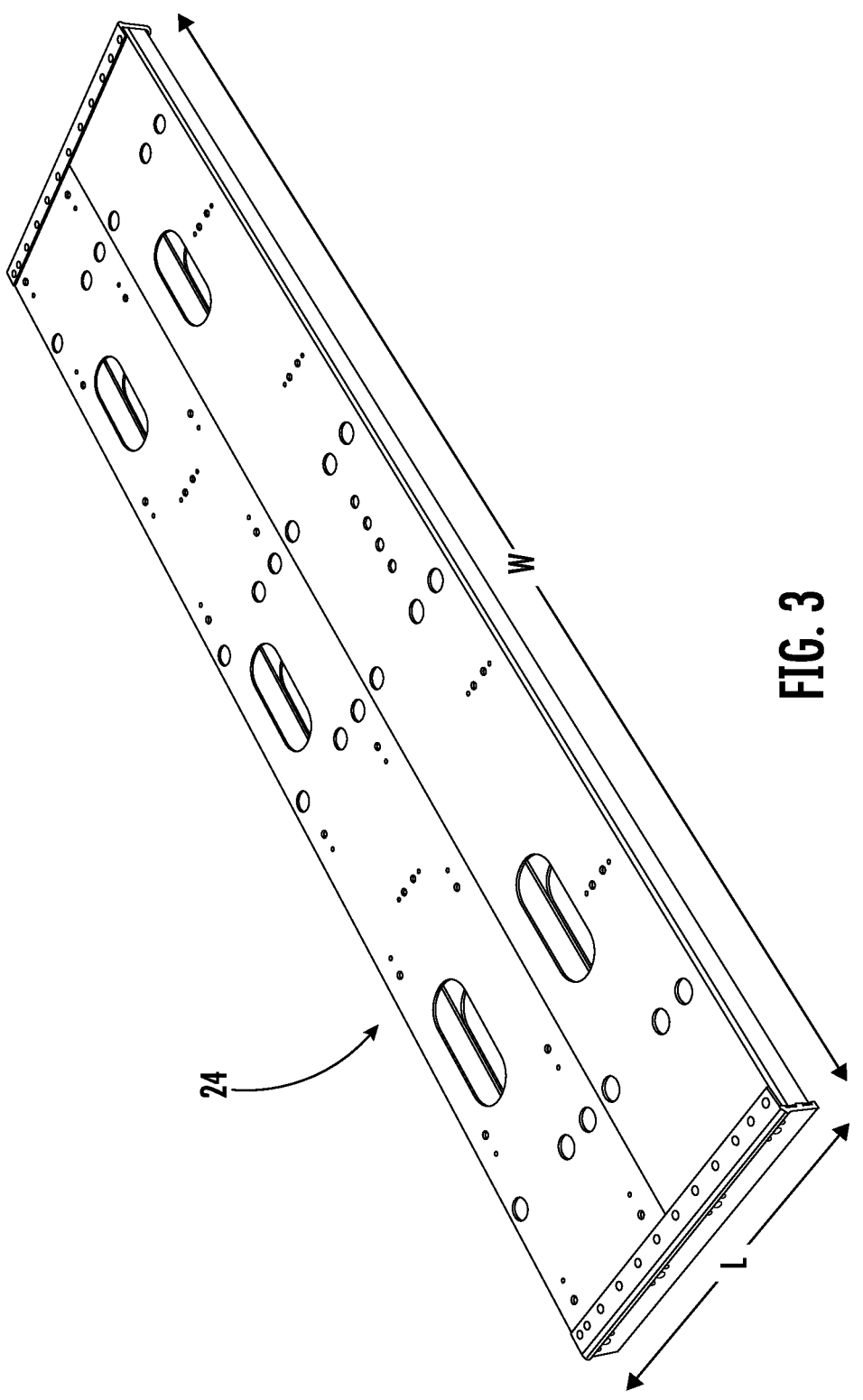
FIG. 3 is a perspective view of a panel from which the platform in the disclosed aerial delivery system is assembled.
Figures 4, 5:
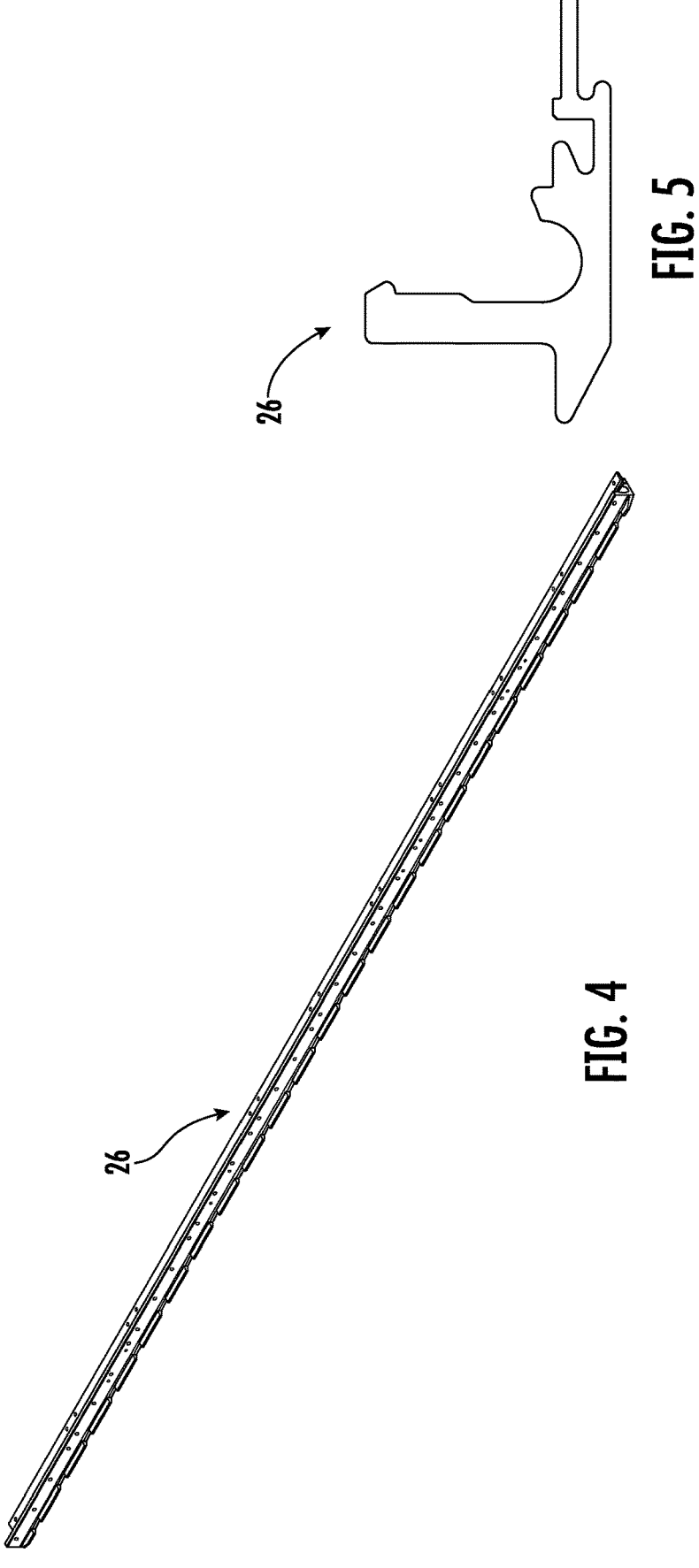
FIG. 4 is a perspective view of one side rail that run the length of the platform.
FIG. 5 is a cross-sectional view of the side rail of FIG. 4.
Figures 6, 7:
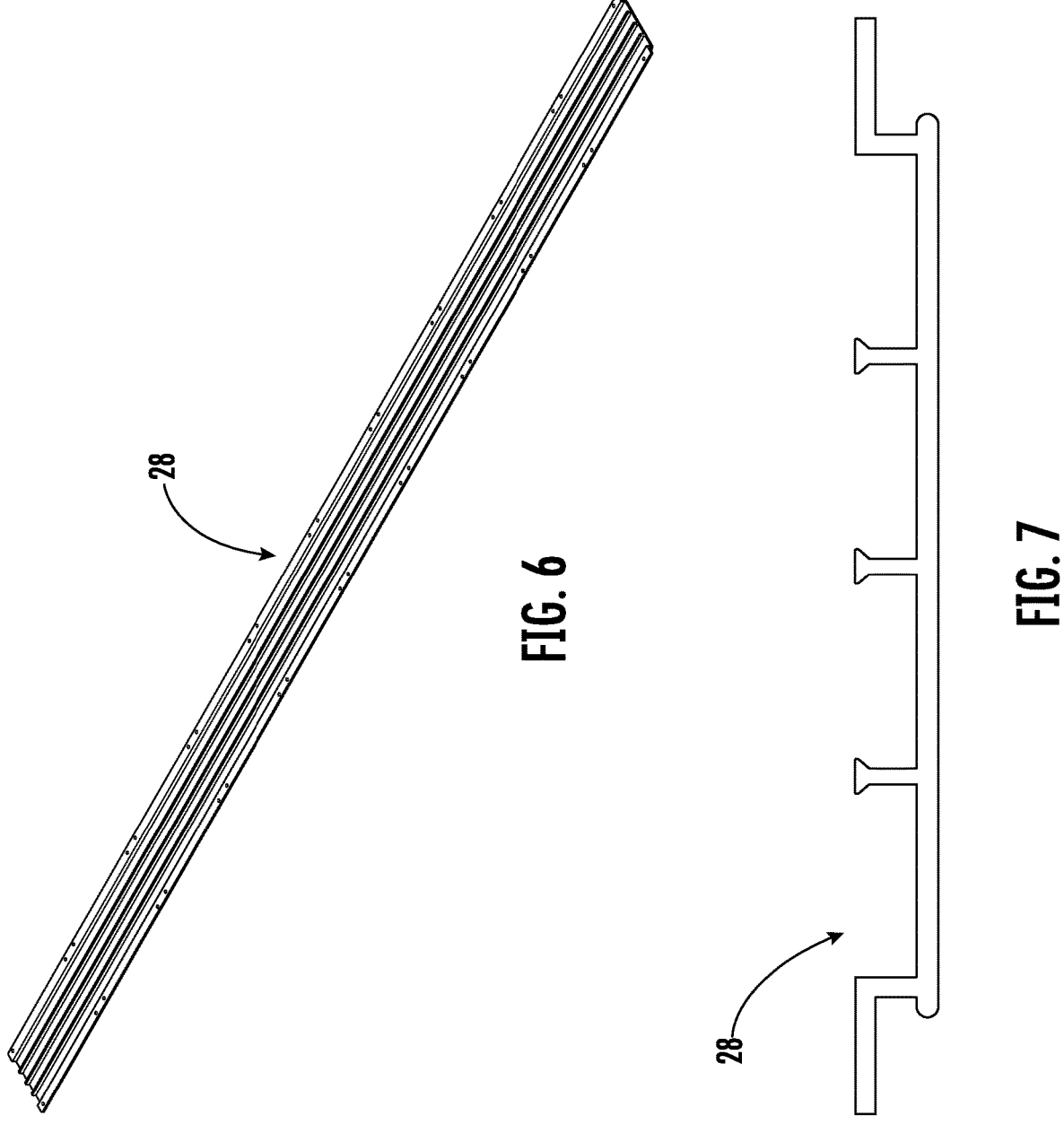
FIG. 6 is a perspective view of a roller pad that runs underneath the length of the platform in alignment with aircraft cargo handling system rollers.
FIG. 7 is a cross-sectional view of the roller pad of FIG. 6.

According to aspects of the disclosure, the platform 12 is constructed from standard components illustrated in FIGS. 3-7. Platform panels 24 as shown in FIG. 3 extend across the width of the platform 12 between longitudinal side rails 26 illustrated in FIGS. 4 and 5. The platform 24 panels are configured in a standard width W of 100 inches (2.540 m) compatible with aircraft cargo handling systems. The platform panels 24 have a dimension L in a direction along the length of the platform of 24 inches (0.610 m). FIGS. 6 and 7 illustrate roller pads 28 that extend the length of the platform 24 in positions aligned with the rows of rollers in the floor of the aircraft. An inventory of side rails 26 and roller pads 28 in length increments of 24 inches are used to construct platforms 24 of different length for different marine craft 100. The side rails 26 and roller pads 28 connect platform panels 24 into a platform 12 of high structural integrity. According to aspects of the disclosure, the platform panels 24 are perforated with a pattern of openings that will allow the platform 12 to sink in delivery scenarios where evidence of craft delivery is undesirable, as in a covert or military cargo delivery situation. The platform 12 can be equipped with descent parachutes 30 and flotation assemblies 32 to allow recovery and reuse of the platform in training scenarios.

Platform lengths of 8 feet to 32 feet can be constructed from an inventory of side rails 26, roller pads 28, and platform panels 24. For example, a 28 foot platform can be constructed from 14 platform panels 24 and fitted with support cradles 20 to deploy a 36 foot marine craft 100. The same standard components can be used to construct a 20 foot platform and support cradles 20 to deploy a 26 foot marine craft. The number and position of support cradles 20 can be selected to support different length of marine craft. For example, a 36 foot marine craft may require 4 support cradles 20 along its length, while a 26 foot marine craft may require 3 cradles 20 along its length. Assembling the UMCADS platform 12 from standard components allows an inventory of standard components to be used to construct a wide variety of UMCADS platforms compatible with a variety of marine craft. This modularity removes the need to maintain an inventory of unique platforms for each marine craft to be deployed.

Figure 8:
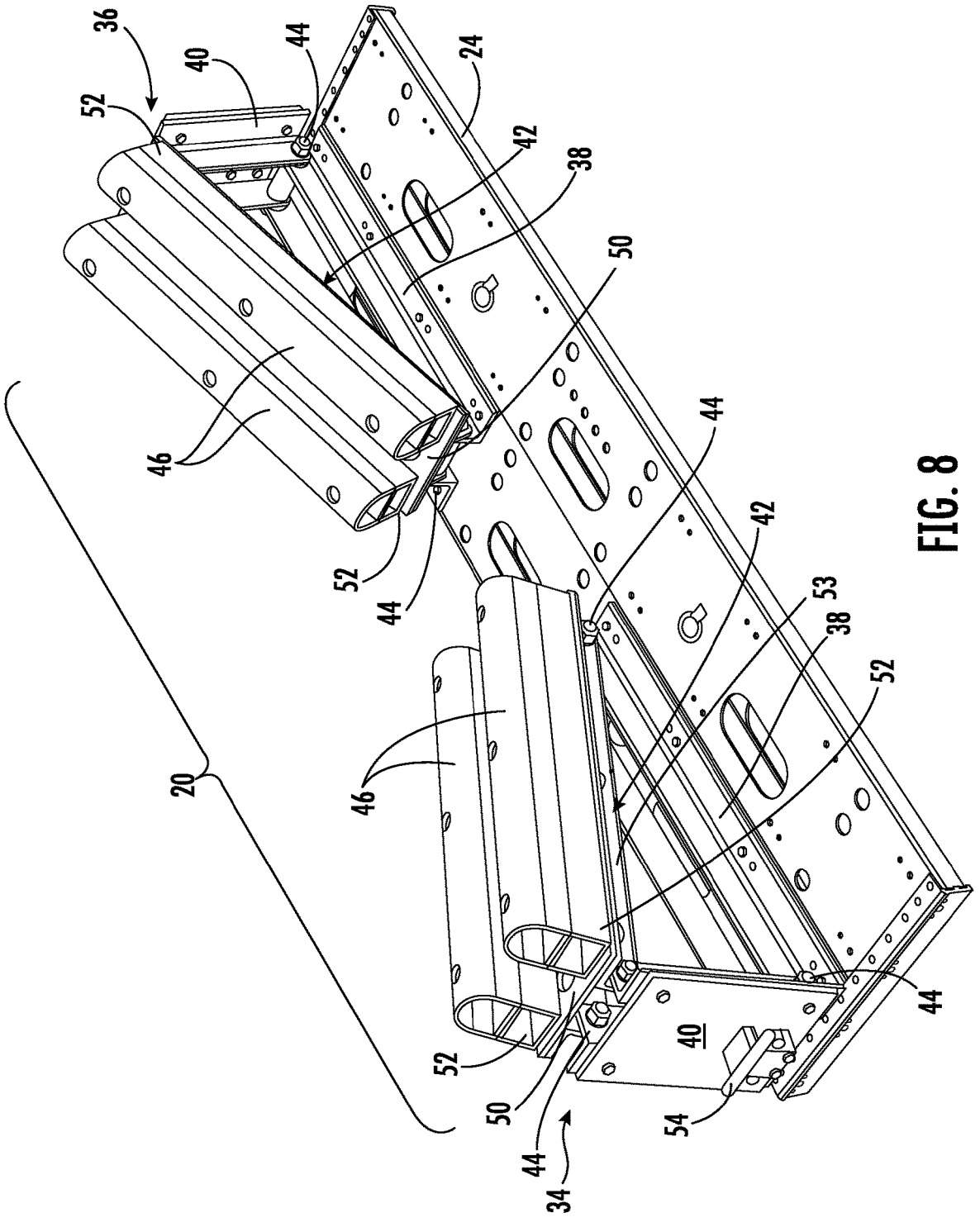
FIG. 8 is a perspective view of an adjustable marine craft support cradle according to aspects of the disclosure.

FIG. 8 illustrates a support cradle 20 mounted to a platform panel 24 according to aspects of the disclosure. The support cradle 20 includes a port cradle portion 34 and a starboard cradle portion 36. The port and starboard cradle portions 34, 36 may be identical and interchangeable with each other as shown in FIG. 8. Each support cradle portion 34, 36 includes a base 38 with standard mounting holes, allowing the cradle 20 to be secured to any of the platform panels 24 along the length of the platform 12 at one foot increments. Each support cradle portion 34, 36 includes the base 38, an outer leg 40 and a hull support 42 connected to pivot relative to each other. The height of the outer leg 40 determines the slope or angle of the hull support 42 relative to the base 38. The slope of the hull support 42 can be changed by exchanging the outer leg 40 with legs of different length between the base and the outer end of the hull support 42. Alternatively, the outer leg 40 could be constructed from overlapping leg parts (not shown) that can be locked together at different positions to adjust the slope of the hull support 42. The length of the hull support 42 remains the same regardless of the height of the outer leg 40 and the pivoting connections 44 between the base 38, outer leg 40 and hull support 42 accommodate outer legs 40 of different lengths. The hull support 42 of each cradle portion 34, 36 includes a pair of heavy duty rubber moldings 46 that will contact the hull 48 of the marine craft 100 without damage. The rubber moldings 46, which may be referred to as "hull contact members" will conform to the shape of the hull 48 and absorb some impact to protect the hull 48 during loading and transport. While two rubber moldings 46 are shown, one or more flexible, impact resistant members may be used. In the disclosed embodiment, the rubber moldings 46 are spaced apart from a hull support backing plate 50 by spacers 52 having a rectangular sectional shape. The height of the rubber moldings 46 relative to the base 38 of the cradle portion 34, 36 can be adjusted by adding or removing spacers 52, or by selecting spacers 52 of different heights (measured between the hull support backing plate 50 to the rear side of the rubber moldings 46). Allowing adjustment of cradle height allows the disclosed UMCADS 10 to accommodate marine craft 100 of different vertical dimensions.

The hull support backing plate 50 connects to hull support rib members 52 in the form of a 90° angle member which may be of any suitable material. The rib members 52 may be connected to the hull support backing plate 50 by any known fastening means such as welding or fasteners. The rib members 52 provide rigidity to the hull support 42 and define openings for fasteners that form a pivoting connection 44 between the hull support 42 to the outer leg 40 and the base 38. According to aspects of the disclosure, each outer leg 40 includes a heavy duty attachment ring 54 on an outside of the outer leg 40 near a lower end of the outer leg. The attachment rings 54 are attached to allow the ring 54 to move freely relative to the outer leg 40. These attachment rings 54 can be used as connection points for hold down straps 56 to secure the marine craft 100 to the platform 12. It will be observed that the disclosed cradle portions 34, 36 are constructed from standard materials such as plates, angle, and box extrusions, and are connected using mil-spec hardware. Use of standard, widely available materials can reduce the cost of acquisition and maintenance of the disclosed UMCADS 10. The disclosed cradle portions 34, 36 are adjustable with respect to their longitudinal position on the platform 12, angle or slope and height relative to the platform 12, allowing the disclosed UMCADS 10 to be configured for a wide variety of marine craft 100.

Figure 9:
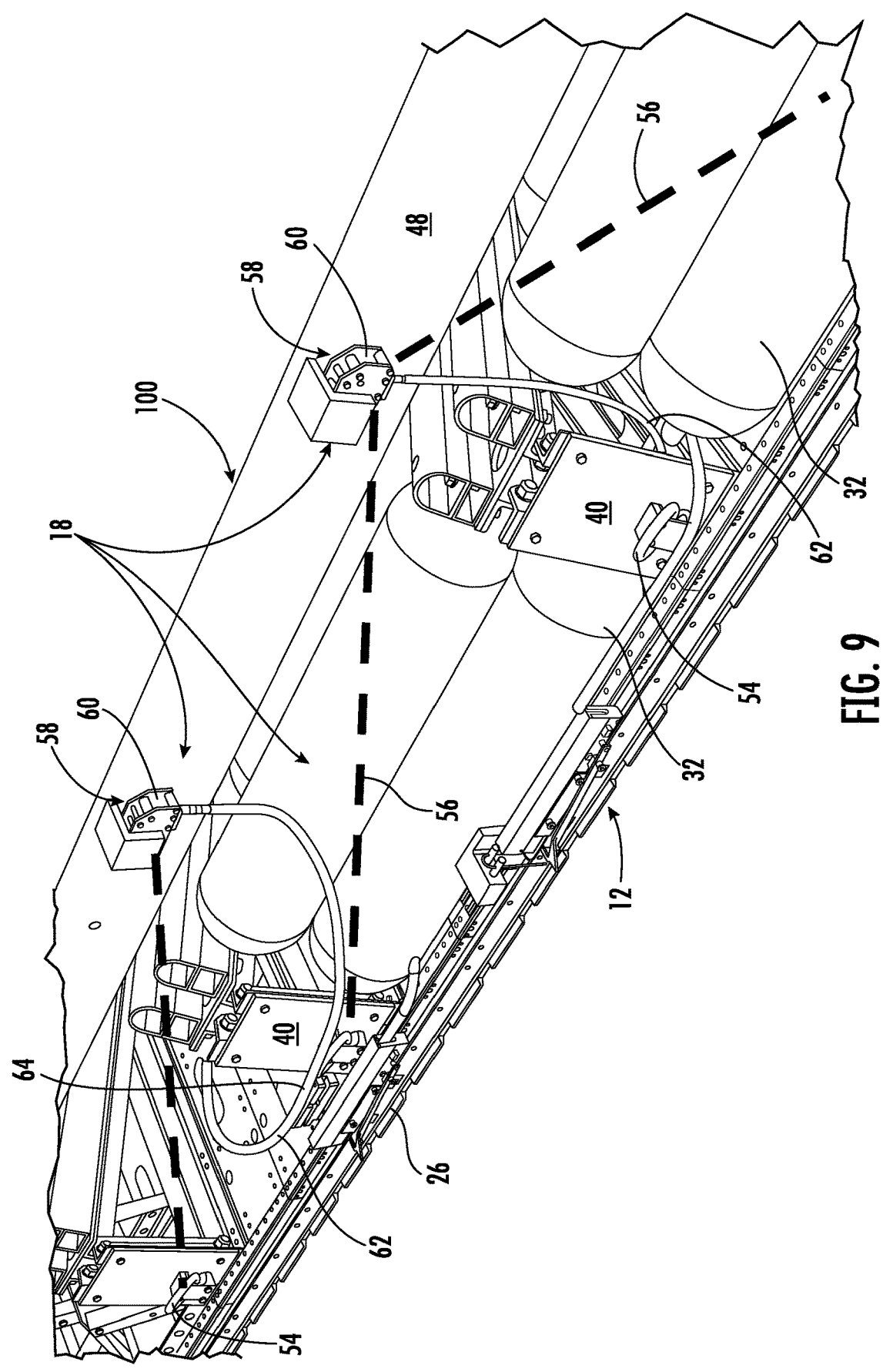
FIG. 9 is an enlarged perspective view of the port side of a marine craft aerial delivery system showing hull attachments, tie down straps, and attachment release mechanisms according to aspects of the disclosure.

FIG. 9 is an enlarged, partial view of the port side of a UMCADS 10 showing hold down straps 56 extending the between attachment points 58 on the hull 48 of the marine craft 100 and the platform 12 to secure the marine craft 100 to the platform 12 for loading and transport. Each of the attachment points 58 includes a releasable coupling 60 through which the hold down 56 straps extend. Flexible cables 62 connect the releasable couplings 60 to a single point release (SPR) system 64 such as that disclosed in commonly owned U.S. Pat. No. 8,414,235, and U.S. Patent Publication No. 2022/0324368, the contents of which are hereby incorporated by reference in their entirety. The hold down straps 56 may extend through or connect to the attachment rings 54 at the base of each outer leg 40 or Type V attachment hardware (not shown) may be used, as is known in the art. The number of hull attachment points 58 and straps 56 can be selected as needed to secure different marine craft 100. The system of releasable couplings 60 and SPR 64 allows the marine craft 100 to remain securely attached to the platform 12 during loading and transport and be reliably released from the platform 12 once clear of the delivery aircraft.

Figure 10:
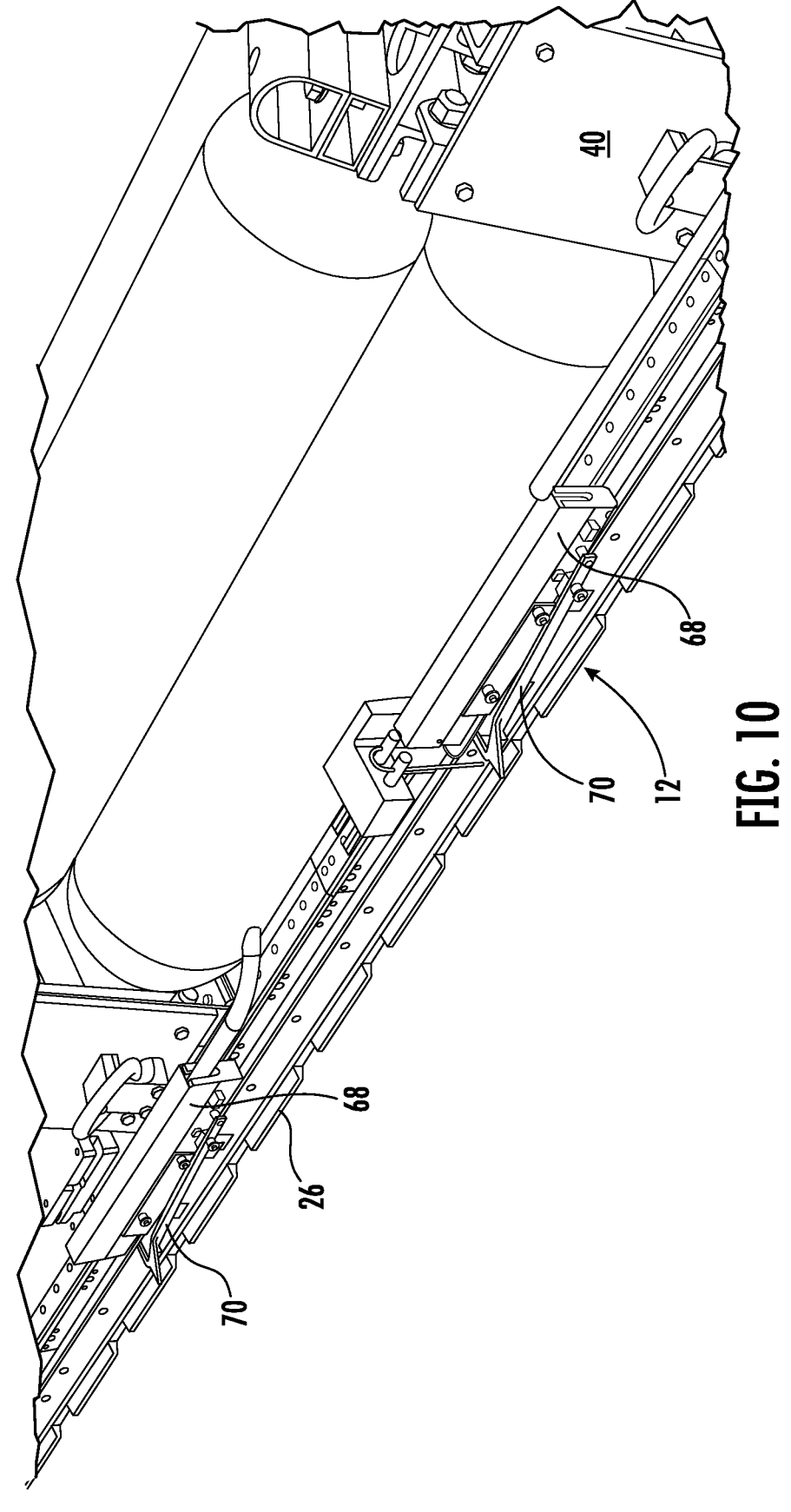
FIG. 10 is an enlarged perspective view of the port side of a marine craft aerial delivery system showing two mechanical actuators, one actuator is connected to the extraction force transfer system and the other is connected to a single point release mechanism according to aspects of the disclosure.

FIG. 10 is an enlarged partial view of the port side of a UMCADS 10 showing two actuators 68 arranged along the port side rail 26. Each actuator 68 includes an operating arm 70 that is supported so long as the platform 12 is in the aircraft but is allowed to drop when the platform 12 is clear of the aircraft. According to aspects of the disclosure, dropping of the operating arm 70 of one actuator 68 is used to initiate a step in the extraction of the platform 12 from the aircraft. One of the actuators 68 is part of the EFTC system, which may be referred to as an extraction force transfer actuator (EFTA) and is standard for deployment of aerial cargo. The EFTC coupling 22 at the aft end 13 of the platform 12 includes a releasable coupling 72 connecting the extraction parachute 74 to the platform 12. When the extraction parachute 74 is deployed from the rear of the aircraft, its force on the EFTC 22 pulls the platform 12 and attached cargo out the open aft end of the aircraft. As the platform 12 clears the aircraft, the operating arm 70 on the EFTA 68 opens the releasable coupling 72 in the EFTC 22, which alters the load path of the extraction parachute 74 from pulling the platform 12 out of the aircraft to deploying the main parachutes 14 from their stored locations on the marine craft 100. With the main parachutes 14 deployed, the marine craft 100 is in a controlled descent. The second actuator 68 is substantially identical to the EFTA, but is connected to the SPR system 64 that is used to open the releasable couplings 60 on the hull attachment points 58 connecting the marine craft 100 to the platform 12. Once the platform 12 is clear of the aircraft, the operating arm 70 of the second actuator 68 drops and triggers the SPR system 64 to release all the connections 60 between the marine craft 100 and the platform 12. This allows the platform 12 to separate from the marine craft 100 in the air. The SPR actuator 68 may incorporate a delay mechanism between the time the operating arm drops and the time the respective couplings 60 are released, to ensure the platform 12 is far enough from the aircraft that release of the craft 100 does not pose a risk to the aircraft. The delay time may be selected to ensure reliable and safe separation of the craft 100 from the platform 12.

Use of two actuators 68 along the side rail 26 of the platform 12 eliminates the need for the prior art actuator positioned in the center of the aft end of the platform and eliminates the need for personnel to be beneath the platform as it is loaded on the aircraft. The second actuator 68 is of a known and proven design, so the use of the second actuator does not adversely impact the reliability of the UMCADS 10 relative to existing practice. The actuators 68 are those currently used for EFTC systems and are stock items in aerial cargo delivery units, so no new or additional parts are required. In the disclosed UMCADS 10, the second actuator 68 is used to trigger an SPR system 64 that is also proven and has been in use for many years. The SPR 64 can be connected to release 4, 6, or 8 latches, 60 which is currently the typical range of couplings used to connect a marine craft 100 to the platform 12. The SPR system 64 can be connected to release additional latches if needed. SPR systems 64 may be mechanically connected to the latches 60 by flexible cables 62 and triggered by a mechanical actuator, as discussed above. Alternatively, the SPR system 64 may include an electronic actuator connected to the latches via mechanical control cables 62. In a further embodiment, each individual latch 60 includes an electronic actuator, with a control box supplying a trigger signal to release the latches 60 simultaneously. The control box may be equipped with a sensor such as a pressure altimeter, accelerometer, timer or water sensor to determine when the latches 60 should be released. These improvements can enhance the potential range of operations. In one example, electronic operation of the SPR system 64 may facilitate release of a marine craft under water. In an alternative configuration, an actuator of the type used for extraction force transfer may be positioned at the forward end 15 of the platform 12. This type of actuator does not need to be armed during aircraft loading and eliminates the need for personnel in a hazardous position during platform loading.

Figure 2:
FIG. 2 is a perspective view of the marine craft aerial delivery system of FIG. 1 with the marine craft and parachutes removed and including port side flotation devices according to aspects of the disclosure.
Figure 11:
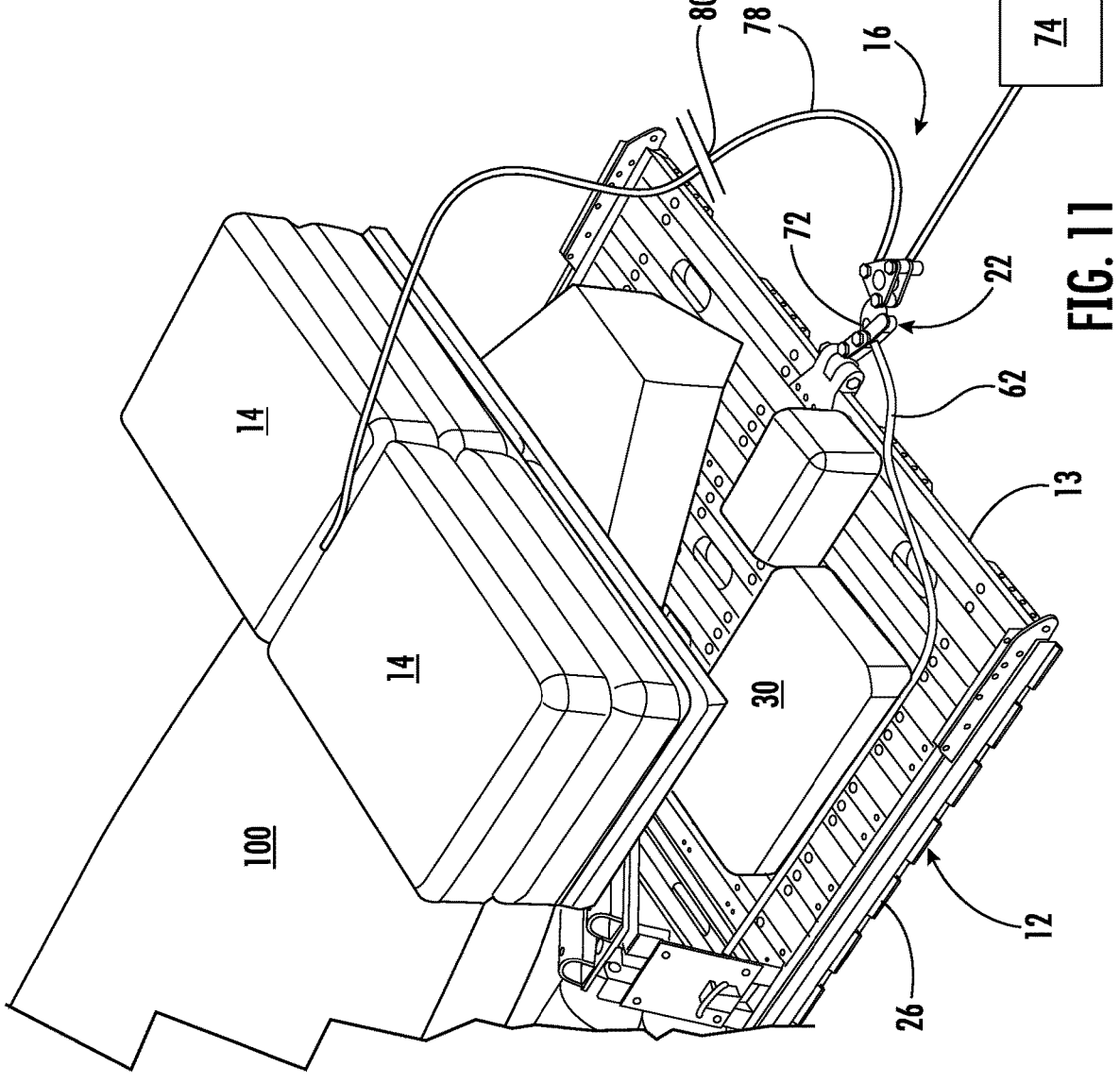
FIG. 11 is a partial perspective view of the aft end of a marine craft aerial delivery system showing an additional safety device according to aspects of the disclosure.

In a covert or military aerial delivery of a marine craft 100, the platform 12 would be allowed to fall into the water and sink. In a training scenario, the platform 12 is equipped with its own descent parachute 30 and flotation 32 to allow the platform 12 to be recovered and re-used. According to aspects of the disclosure, the flotation assemblies 32 shown in FIGS. 1 and 2 would be arranged on both the port and starboard sides of the platform 12. FIG. 2 shows flotation assemblies 32 only on the port side of the platform 12. The flotation assemblies 32 may employ conventional boat fenders, which are large air-filled resilient products used to protect marine craft from rubbing against docks. The sealed flotation devices can be arranged on the platform and secured in place in a configuration that ensures the platform 12 will remain at the surface of the water. A descent control parachute 30 is connected to the aft end 13 of the platform 12 as shown in FIGS. 1 and 11. The descent control parachute(s) 30 for the platform 12 are opened by a deployment line (not shown) attached to the prow of the craft 100. Once the craft 100 detaches from the platform 12, this deployment line is tensioned and deploys the platform descent parachute(s) 30. The descent parachute 30 will control descent of the platform 12, which will enter the water forward end 15 first. The disclosed UMCADS 10 may include splash guards 76 on the forward end 15 of the platform 12, to protect the UMCADS 10 from damage during impact with the water. FIG. 2 illustrates representative splash guards 76 arranged to prevent direct impact of water against the forward most support cradle portions 34, 36 and flotation assemblies 32, which will be the first projecting assemblies of the UMCADS 10 impacted by the water. The structure and arrangement of the splash guards 76 may be altered to ensure their effectiveness. Splash guards 76 may be modular and interchangeable.

The disclosed UMCADS 10 may include an additional safety device. According to this embodiment, shown in FIG. 11, the deployment line 78 is provided with an additional link 80. The deployment line 78 joins the extraction parachute 74 to the main parachutes 14. In a conventional EFTC system, there is a hazard that the extractor parachute 74 forces could be transmitted early in the deployment cycle with he potential for the main parachutes 14 to deploy while the platform 12 is still in the aircraft. This hazard, if it were to occur, could induce an uncontrolled flight parameter to the aircraft that could cause a catastrophic event. The novel feature of the UMCADS 10 is to break the deployment line with an existing open link 80. Not until there is positive movement of the UMCADS 10 in the aft direction would the link 80 close. This mitigates against opening of the main parachutes 14 while the platform 12 is still in the aircraft, while enabling the normal deployment operation of the main parachutes 14 once the UMCADS 10 is clear of the aircraft.

What is claimed:

1. An aerial delivery system for marine craft comprising a hull, said aerial delivery system comprising:
a platform having a length between fore and aft ends and a width between port and starboard side rails;
a plurality of cradles securable at selectable, spaced intervals along the length of the platform, each cradle comprising port and starboard cradle portions, each port and starboard cradle portion including a hull support having hull contact members configured to at least partially deform upon contact with the hull of the marine craft, each port and starboard cradle portion having an inner end facing a center line of the platform and an outer end respectively facing the port and starboard side rails, the inner ends of the port cradle portions spaced apart from the inner ends of the starboard cradle portions to define a gap between the hull supports of the port and starboard cradle portions, said gap extending longitudinally along the platform between the plurality of cradles;
a plurality of releasable latches secured to the hull of the marine craft, said releasable latches connected to a single point release mechanism;
at least one elongated tie down member extending from the platform through the plurality of releasable latches and tensionable to secure the marine craft to the platform during loading and transport of the aerial delivery system in an aircraft;
an actuator secured to the platform, said actuator including an operating arm having a first position where the operating arm is supported while the platform is in the aircraft and a second position that can be reached by the operating arm only after the platform is no longer within the aircraft;
wherein the actuator operating arm is connected to the single point release mechanism to release said releasable latches and disconnect the marine craft from the platform after the platform has left the aircraft and while the platform and marine craft are airborne.

2. The aerial delivery system of claim 1, comprising:
a plurality of main parachutes secured directly or indirectly to the hull of the marine craft;
an extraction force transfer coupling (EFTC) at an aft end of the platform, said EFTC including a releasable force transfer latch to the platform;
an extraction parachute connected to the platform by the EFTC and also to the plurality of parachutes, the EFTC preventing force transfer between the extraction parachute and the main parachutes until said force transfer latch is released; and
an extraction force transfer actuator (EFTA) having an operating arm supported while the platform is in the aircraft,
wherein the operating arm of the EFTA moves to a release position after the platform leaves the aircraft, which releases the force transfer latch, allowing the extraction parachute to deploy the main parachutes.

3. The aerial delivery system of claim 2, wherein the actuator and the EFTA are arranged along a side rail of the platform.

4. The aerial delivery system of claim 1, wherein each cradle portion is configurable to position the hull support at a selectable angle and height relative to said platform.

5. The aerial delivery system of claim 1, wherein each cradle portion includes a base connected to the platform, an outer leg extending between an outer end of the base and an outer end of the hull support, and three pivotable connections between the hull support, base, and outer leg.

6. The aerial delivery system of claim 4, wherein a length of the outer leg between the outer end of the base and the outer end of the hull support determines an angle of the hull support relative to the platform.

7. The aerial delivery system of claim 6, wherein the length of the outer leg can be selected or adjusted to change the angle of the hull support relative to the platform.

8. The aerial delivery system of claim 1, wherein each cradle portion includes spacers between the hull support and the hull contact members, said spacers defining a height of the hull contact members relative to the platform, the height of the hull contact members adjustable by removal or addition of spacers, or by use of spacers of different dimensions.

9. The aerial delivery system of claim 1, wherein said single point release mechanism is connected to the plurality of releasable latches by one or more flexible cables and said single point release mechanism applies force to the one or more flexible cables to release the releasable latches simultaneously.

10. The aerial delivery system of claim 1, wherein the releasable latches include an electrically actuated release mechanism and said single point release mechanism is configured to electrically actuate the release mechanisms.

11. The aerial delivery system of claim 2, comprising a link in the load path between the extraction parachute and the main parachutes, said link configured to remain open until the platform is in motion in aft direction relative to the aircraft.

12. An aerial delivery system for marine craft comprising a hull, said aerial delivery system comprising:

a platform having a length between fore and aft ends and a width between port and starboard side rails;

a plurality of cradles securable at selectable, spaced intervals along the length of the platform, each cradle comprising port and starboard cradle portions, each port and starboard cradle portion including a hull support having hull contact members configured to at least partially deform upon contact with the hull of the marine craft;

a plurality of releasable latches secured to the hull of the marine craft, said releasable latches connected to a single point release mechanism;

at least one elongated tie down member extending from the platform through the plurality of releasable latches and tensionable to secure the marine craft to the platform during loading and transport of the aerial delivery system in an aircraft;

an actuator secured to the platform, said actuator including an operating arm having a first position where the operating arm is supported while the platform is in the aircraft and a second position that can be reached by the operating arm only after the platform is no longer within the aircraft; and a flotation assembly secured to the platform, said flotation assembly configured to support the platform in water, wherein the actuator operating arm is connected to the single point release mechanism to release said releasable latches and disconnect the marine craft from the platform after the platform has left the aircraft and while the platform and marine craft are airborne.

13. The aerial delivery system of claim 12, comprising a platform descent parachute connected to the platform, said platform descent parachute deployed after separation of the marine craft from the platform.

14. The aerial delivery system of claim 13, comprising one or more splash guards secured to the platform, said splash guards arranged to protect at least one cradle or flotation assembly from water impact when the platform enters water.

15. An aerial delivery system for marine craft comprising a hull, said aerial delivery system comprising:

a platform having a length between fore and aft ends and a width between port and starboard side rails;

a plurality of cradles securable at selectable, spaced intervals along the length of the platform, each cradle comprising port and starboard cradle portions, each port and starboard cradle portion including a hull support having hull contact members configured to at least partially deform upon contact with the hull of the marine craft, each port and starboard cradle portion including spacers between the hull support and the hull contact members, said spacers defining a height of the hull contact members relative to the platform, the height of the hull contact members adjustable by removal or addition of spacers, or by use of spacers having different dimensions;

a plurality of releasable latches secured to the hull of the marine craft, said releasable latches connected to a single point release mechanism;

at least one elongated tie down member extending from the platform through the plurality of releasable latches and tensionable to secure the marine craft to the platform during loading and transport of the aerial delivery system in an aircraft;

an actuator secured to the platform, said actuator having a first position while the platform is in the aircraft and a second position that can be reached only after the platform is no longer within the aircraft;

wherein the actuator is connected to the single point release mechanism to release said releasable latches and disconnect the marine craft from the platform after the platform has left the aircraft and while the platform and marine craft are airborne.

16. The aerial delivery system of claim 15, wherein each port and starboard cradle portion has an inner end facing a center line of the platform and an outer end respectively facing the port and starboard side rails, the inner ends of the port cradle portions spaced apart from the inner ends of the starboard cradle portions to define a gap between the hull supports of the port and starboard cradle portions, said gap extending longitudinally along the platform between the plurality of cradles.

17. The aerial delivery system of claim 15, comprising a flotation assembly secured to the platform, said flotation assembly configured to support the platform in water.

18. The aerial delivery system of claim 15, wherein each cradle portion includes a base connected to the platform, an outer leg extending between an outer end of the base and an outer end of the hull support, and three pivotable connections between the hull support, base, and outer leg.

19. The aerial delivery system of claim 18, wherein a length of the outer leg between the outer end of the base and the outer end of the hull support determines an angle of the hull support relative to the platform.

20. The aerial delivery system of claim 19, wherein the length of the outer leg can be selected or adjusted to change the angle of the hull support relative to the platform.

* * * * *